United States Patent Office 3,537,190
Patented Nov. 3, 1970

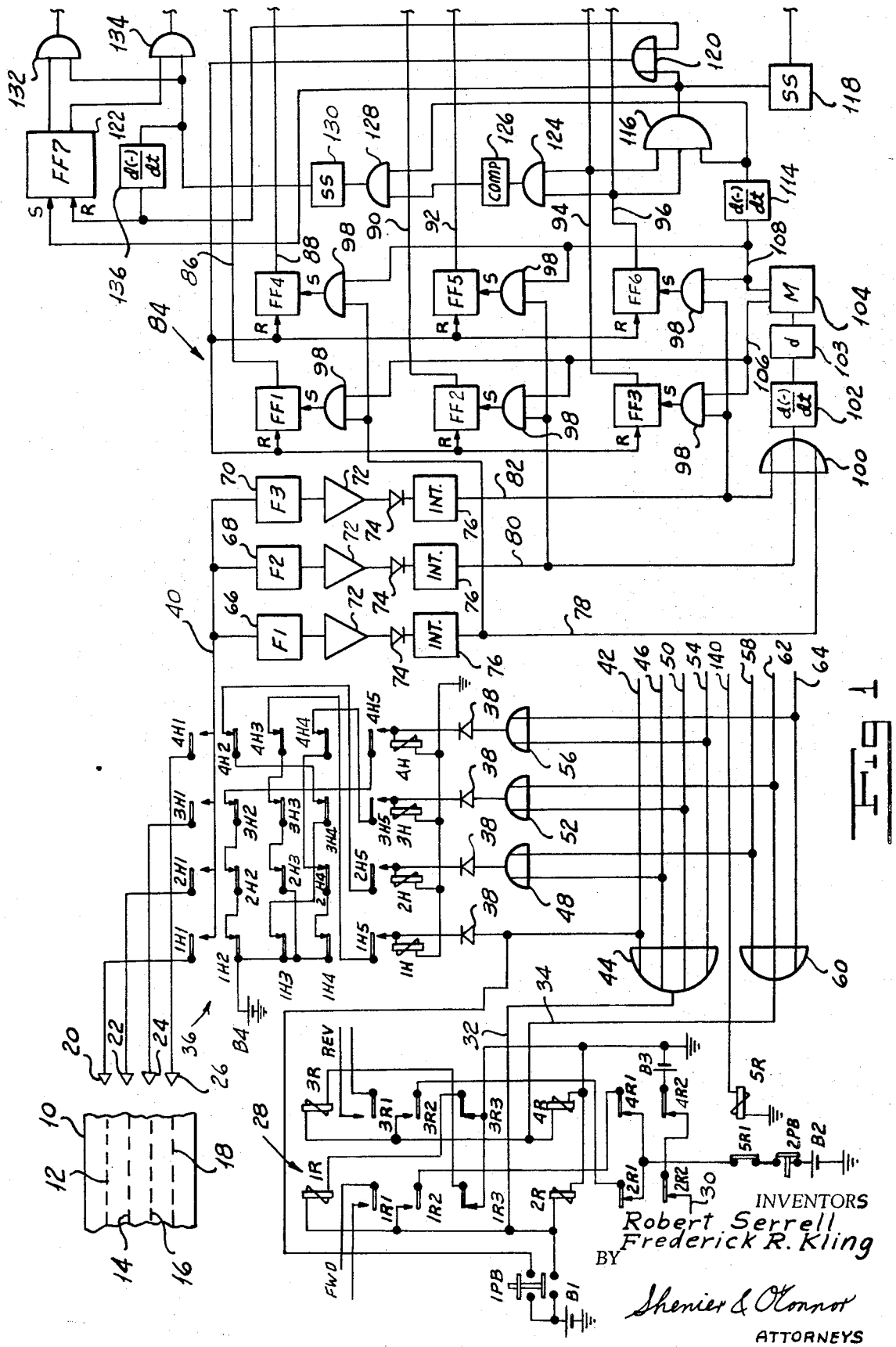

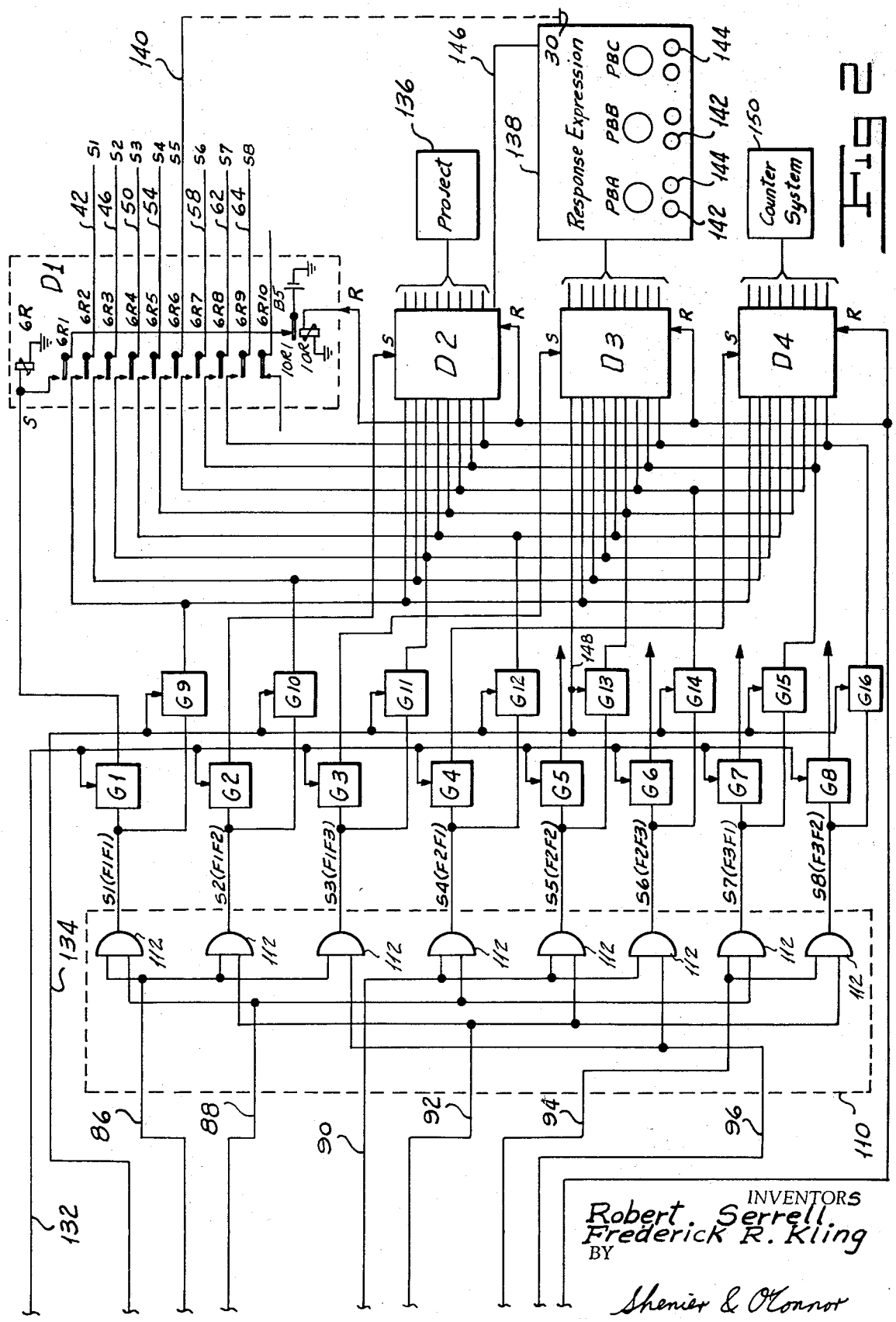

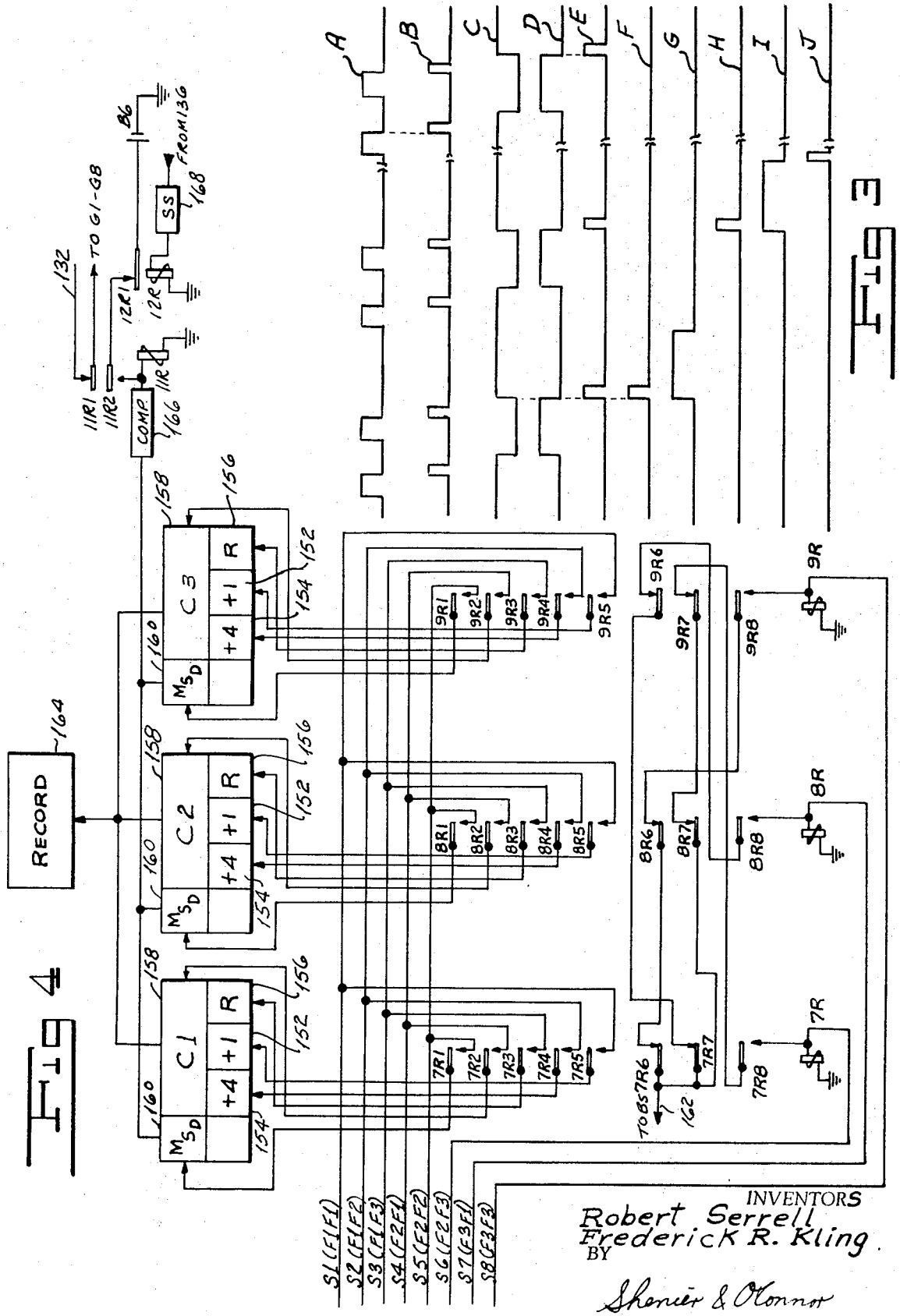

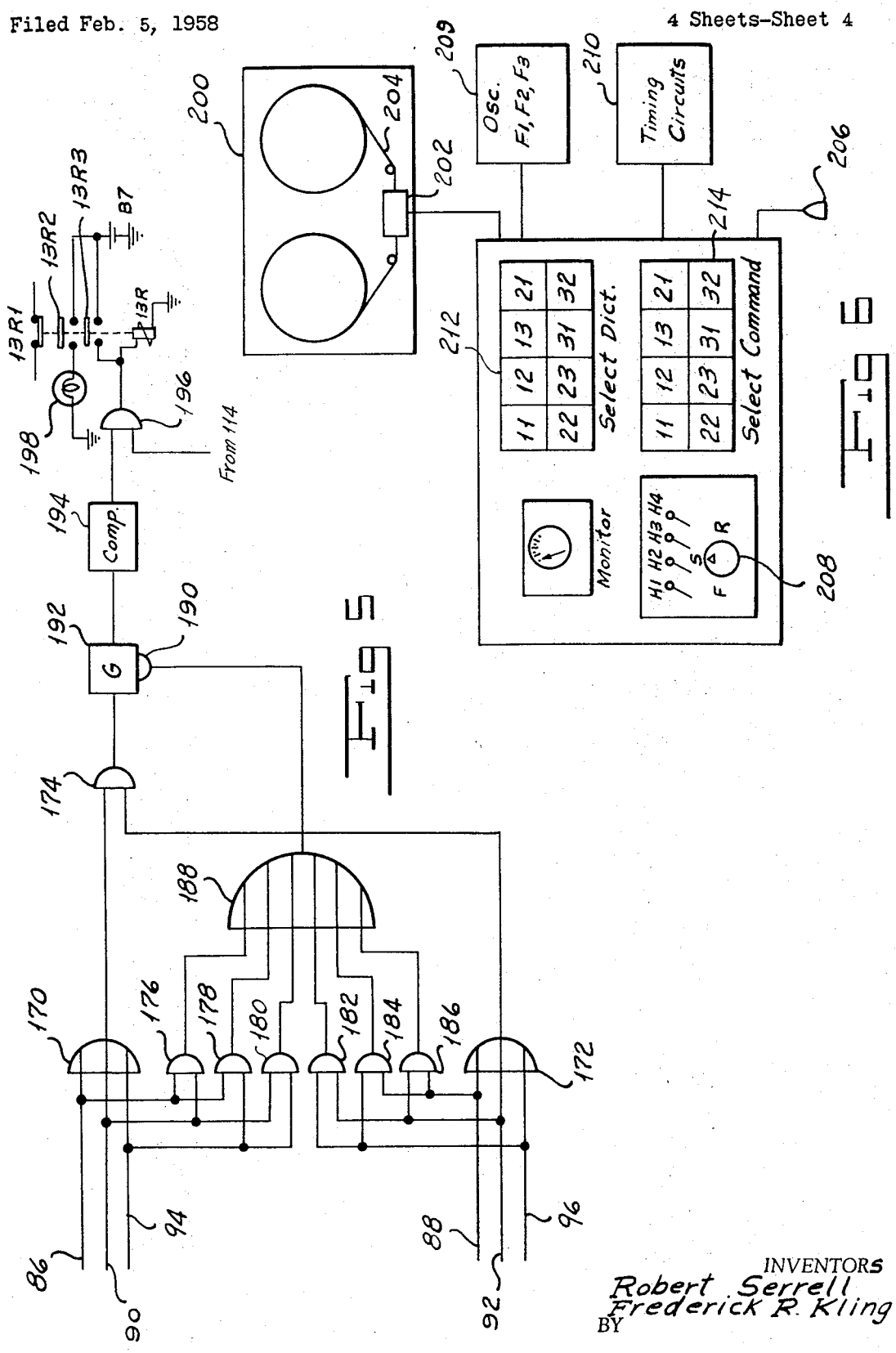

3,537,190
TEACHING MACHINE CONTROL SYSTEM
Robert Serrell, Princeton, N.J., and Frederick R. Kling, Point Pleasant, Pa., assignors to Educational Testing Service, Princeton, N.J., a non-profit corporation of New York
Filed Feb. 5, 1968, Ser. No. 703,066
Int. Cl. G09b 7/04
U.S. Cl. 35—9                                     18 Claims

ABSTRACT OF THE DISCLOSURE

A teaching machine control system for presenting a student or other person with a variable audible and visible program from one of a plurality of record tracks, each of which carries audible program information and superimposed groups of command pulses, each group comprising a plurality of pairs of pulses of various supersonic frequencies. The groups of pulses are fed to a decoding mechanism which is responsive to the combinations of frequencies of the pulse pairs selectively to switch tracks, to change the visible program, to set up a response assignment, to record a score or to perform other functions.

BACKGROUND OF THE INVENTION

There are known in the prior art teaching machines which are intended to present a combined audible and visible program to a student or the like. Our copending application, Ser. No. 560,620, filed June 27, 1966, now Pat. No. 3,484,950, discloses a teaching machine of that general type which incorporates a number of desirable features. It makes provision for changing tracks or changing the visible program in the course of presentation thereof. It also incorporates means for permitting the student to make a selection and with means responsive to the selection which has been made for determining the subsequent program operation. It also "prompts" the student in the event that he has not made a selection or answered within a predetermined time after he has been instructed to do so.

In the machine disclosed in our copending application, the audible program information is contained in a plurality of record tracks on a magnetic tape or the like. These tracks have superposed thereon relatively long duration pulses of different respective supersonic frequencies corresponding to control operations which are to be performed. For example, a pulse of one supersonic frequency may indicate that a track switching operation is to take place. This pulse enables control circuitry to be actuated to perform the desired operation of, for example, switching from one pickup head to another pickup head and concomitantly causing the tape to be driven in a forward direction or a backward direction. In order to actuate the enabled mechanism in the machine disclosed in our copending application, we provided a control track containing no audible program information but carrying a series of pulses within the audible range of various frequencies which are fed to the enabled mechanism to produce the desired operation.

We have invented a teaching machine control system which is an improvement over the system shown in our copending application. Our control system makes optimum use of the recording surface of the record medium carrying the audible program and the control signals. Our system does away with the necessity for providing a control track. It makes possible different control commands for different voice tracks at the same location on the record medium.

It further simplifies the operation of recording master tapes since only one track need be recorded at a time.

Our system provides for an expanded set of control commands. It makes provision for recording a student's responses to the program. It is relatively simple for the result achieved thereby.

SUMMARY OF THE INVENTION

One object of our invention is to provide a teaching machine control system which makes optimum use of the space available on the record medium.

Another object of our invention is to provide a teaching machine control system which permits different control commands for different tracks at the same location on the record medium.

A further object of our invention is to provide a teaching machine control system which is more versatile than are control systems of the prior art.

Other and further objects of our invention will appear from the following description.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a schematic view illustrating a portion of the circuitry of our teaching machine control system.

FIG. 2 is a schematic view of a further portion of the control circuitry of our teaching machine.

FIG. 3 is a diagrammatic view illustrating signals appearing at various points in the teaching machine control system illustrated in FIGS. 1 and 2.

FIG. 4 is a schematic view illustrating a counter system forming a part of our teaching machine control system.

FIG. 5 is a schematic view of one form of checking circuit for checking the operation of our teaching machine control system.

FIG. 6 is a block diagram illustrating a system for producing master tapes for use with our teaching machine control system.

DESCRIPTION OF THE PREFERRED EMBODIMENT

Referring now to FIG. 1 of the drawings, the teaching machine with which our control system is associated includes a magnetic tape 10 having four tracks 12, 14, 16 and 18, each of which contains recorded instructional information and which may also contain program-controlling commands in the form of groups of pairs of pulses of frequencies which are higher than audible frequencies. Associated with the tape 10 are four reading heads 20, 22, 24 and 26 corresponding to the respective tracks 12, 14, 16 and 18. The tape 10 is driven relative to the heads by any suitable reversible drive motor (not shown) of any suitable type known to the art.

We provide a tape direction drive control system, indicated generally by the reference character 28, adapted to be actuated in a manner to be described to drive the tape 10 either in a forward or in a backward direction. This system includes a forward drive control relay winding 1R having associated normally open switches 1R1 and 1R2 and a normally closed switch 1R3. The forward drive portion of the tape drive control circuit includes another relay winding 2R having associated normally closed switches 2R1 and 2R2. The reverse drive control portion of control circuit 28 includes a relay winding 3R having associated normally open switches 3R1 and 3R2 and a normally closed switch 3R3, as well as a relay winding 4R having associated normally closed switches 4R1 and 4R2.

We connect one set of contacts of a push-button switch 1PB between a battery B1 and the windings 1R and 2R. Upon actuation of switch 1PB a circuit is complete from the battery B1 through winding 1R and through the contact 3R3 to ground. At the same time a circuit is complete from battery B1 and through winding 2R to ground. Energization of winding 1R in this manner closes switch 1R1 to complete a circuit (not shown) to the forward drive system for the tape 10. Closing of switch 1R2 completes a holding circuit for winding 1R through switch contact 4R1, through a normally closed switch 5R1, through a stop push button 2PB to a battery B2 to hold winding 1R energized when the switch 1PB is released. Opening of the switch 1R3 prevents concomitant energization of winding 3R with winding 1R. Opening of the switch 2R1 interrupts the holding circuit, to be described, for winding 3R in the event that relay winding had been energized. The switches 2R2 and 4R2 are connected in series between a battery B3 and a conductor 30 to apply a potential to that conductor when both switches are closed. Opening of the switch 2R2 removes the potential from the conductor 30.

Not only will operation of the push button 1PB energize the forward drive tape control relay 1R but, also, a signal on a conductor 32 energizes the relay momentarily until its holding circuit has had an opportunity to take over. Similarly, a signal appearing on a conductor 34 momentarily energizes winding 3R through the normally closed switch 1R3 associated with winding 1R. When winding 3R is thus momentarily energized, its switch 3R1 closes to complete the reverse drive circuit (not shown) for the tape. Switch 3R2 closes to complete a holding circuit for the winding 3R through contact 2R1, through switch 5R1 and through switch 2PB to battery B2. At the same time switch 3R3 opens to prevent concomitant energization of winding 1R. The signal which appears on conductor 34 to cause the tape to be driven in a reverse direction also energizes winding 4R to open switch 4R1 to interrupt the holding circuit of winding 1R. This operation also opens switch 4R2 to remove the potential of battery B3 from conductor 30.

We further provide our control system with a head selection circuit 36 which is adapted to be energized to select a head and to couple that head to the programming arrangement of our control system. To achieve this result, we provide four relay windings 1H to 4H corresponding to the respective heads 20, 22, 24 and 26. Winding 1H has five switches 1H1 to 1H5 associated therewith. Each of the switches 1H1 and 1H5 is a normally open switch while the remaining switches associated with winding 1H are normally closed. Gangs of switches similar to switches 1H1 to 1H5 are provided for the remaining relays 2H through 4H. We provide a respective input diode 38 for each of the windings 1H to 4H. A signal applied to one of the diodes causes its associated head to be connected to a channel 40 and to remain connected thereto until a signal is applied to one of the other diodes to switch to the head corresponding to that diode. We also so arrange the system 36 as to prevent two of the heads from being rendered active at one time. By way of example, we will outline the portion of the circuit 36 in connecting the head 20 to the channel 40.

Upon the application of a signal to diode 38 associated with winding 1H, the winding is momentarily energized. Switch 1H5 closes to complete a holding circuit from the winding through switch 1H5 and through switches 4H3, 3H3 and 2H3 to battery B4. Switch 1H1 closes to connect the head 20 to channel 40. Switch 1H2 opens to interrupt the holding circuit of winding 4H, switch 1H4 opens to interrupt the holding circuit of winding 3H, and switch 1H3 opens to interrupt the holding circuit of winding 2H.

Before explaining the manner in which various control signals are produced in operation of our control system, it is to be noted that there are a number of possible combinations of track selection and tape drive direction which can be achieved with our system. A signal appearing on a conductor 42 energizes winding 1H to select track 12. This signal also passes through a four-input OR circuit 44 to conductor 32 to energize the forward drive system. Since we initially select the track 12 for presentation of its program, we connect another set of contacts of the start push button 1PB to the conductor 42. A signal appearing on conductor 46 passes through OR circuit 44 to conductor 32 for forward movement of the tape. A two-input OR circuit 48 applies this signal through a diode 38 to winding 2H to select track 14. A signal appearing on a conductor 50 passes through OR circuit 44 for forward tape motion and through a two-input OR circuit 52 to energize winding 3H to select the head 24 corresponding to track 16. A signal appearing on a conductor 54 passes through OR circuit 44 to provide forward tape motion and through a two-input OR circuit 56 to energize winding 4H to select track 18. We connect a conductor 58 to a three-input OR circuit 60 connected to channel 34 for reverse motion of the tape and to circuit 48 to select track 14. A conductor 62 is connected to OR circuit 60 and to OR circuit 52 for reverse tape movement and selection of track 16. A conductor 64 is connected to OR circuit 60 and to OR circuit 56 for reverse movement of the tape and selection of track 18. It is to be noted that owing to the fact that track 12 is the main or reference track of the machine and as such is completely packed in the forward direction, it is not necessary to provide any reverse movement of the tape when that track has been selected.

As has been explained hereinabove, all of the tracks 12, 14, 16 and 18 are information tracks and, in addition, any of them may contain programming information at any location. Each programming command is represented by groups of pairs of pulses of ultrasonic signals of different frequencies such, for example, as frequencies F1, F2 and F3. We frequency encode these signals so as to produce the desired operation in a manner to be described. With three available frequencies F1 to F3, it will readily be apparent that there are nine possible combinations, F1F1, F1F2, F1F3, F2F1, F2F2, F2F3, F3F1, F3F2 and F3F3.

We connect respective filters 66, 68 and 70 tuned to the frequencies F1, F2 and F3 to the channel 40. An amplifier 72, a rectifier 74 and an integrating circuit 76, connected in series, apply the output of filter 66 to a channel 78. Similar elements connect filter 68 to a channel 80 and connect filter 70 to a channel 82. We apply the signals on channels 78, 80 and 82 to an array, indicated generally by the reference character 84, of flip-flops FF1 to FF6 in such a way as to provide distinct signals on respective conductors 86, 88, 90, 92, 94 and 96 as determined by the frequencies of the pulses of each pair.

We provide a two-input AND circuit 98 associated with the set input terminal of each flip-flop. We apply the signal on conductor 78 to one input terminal of each of the AND circuits associated with flip-flops FF1 and FF4 and to a three-input OR circuit 100. Similarly, we apply the signal on channel 80 to the OR circuit 100 and to one input terminal of each of the AND circuits 98 associated with flip-flops FF2 and FF5. The signal on channel 82 is applied to OR circuit 100 and to one input terminal of each of the AND circuits connected to flip-flops FF3 and FF6.

Considering the appearance of a pulse pair on the channel 40, by way of example let us assume that the pulses of the pair have frequencies F1 and F3. The wave form of the pulses on the tape is designated as A in FIG. 3. Assuming that the first pulse has a frequency F1, it is applied to one input terminal of the AND circuit 98 associated with flip-flop FF1. At the same time the OR circuit 100 applies this pulse to a differentiating network 102 which produces a pulse at the trailing edge of the pulse on channel 78. We have indicated the wave form of the pulse output from network 102 as B in FIG. 3. We apply the output of network 102 to a monostable multivibrator 104 through a delay network 103. Multivibrator 104 normally provides an output on a first channel 106 and normally has no output on channel 108. In response to an input pulse the output on channel 106 is removed and a signal appears on channel 108. We so select the delay of network 103 and the period of the multivibrator with relation to the time between pulses of a pair and the time between pairs that, following the initial pulse of a pair, an output appears on channel 108 for a sufficiently long time to ensure its existence at the occurrence of the second pulse of the pair. At the same time we ensure that initial actuation of the multivibrator by the second pulse of a pair does not produce such an output on channel 108 as will continue until the occurrence of the first pulse of the next pair. Thus we prevent possible malfunction when, for example, the tape is started between the pulses of the first pair of a group of command pulses. We connect channel 106 to the other input terminals of the AND circuits 98 associated with flip-flops FF1 to FF3. The channel 108 is connected to the other input terminals of the two-input AND circuits 98 associated with flip-flops FF4 to FF6. We have indicated the signal on channel 106 by the wave form C and the signal on channel 108 by the wave form D in FIG. 3.

Considering still the example wherein a pair of pulses of frequencies F1 and F3 appear sequentially on channel 40, in response to the first pulse differentiator 102 provides an input to multivibrator 104 to cause its output on channel 106 to change from a normally "on" state to an "off" state and to change the output on channel 108 from a normally "off" state to an "on" state. However, since the pulse on channel 78 was applied to the AND circuit of flip-flop FF1 before the output on channel 106 changed state, a signal is applied to the set channel of FF1 to provide an output on conductor 86.

Upon the occurrence of the second pulse of frequency F3 on channel 40, channel 82 applies an input signal to one terminal of each of the AND circuits associated with FF3 and FF6. At this time the output on channel 108 has been changed from off to on so that FF6 produces an output on channel 96.

The operation of flip-flop array 84 can be followed through in the manner described above so as to demonstrate that each pair of pulses produces outputs on a distinct pair of the control signal conductors. Thus, F1F1 provides signals on 86 and 88, F1F2 on 86 and 92, F1F3 on 86 and 96, F2F1 on 90 and 88, F2F2 on 90 and 92, F2F3 on 90 and 96, F3F1 on 94 and 88, F3F2 on 94 and 92 and F3F3 on 94 and 96.

We connect conductors 86, 88, 90, 92, 94 and 96 to a de-coding network 110 to provide eight distinct outputs on channels S1 to S8 for each pair of outputs, save one pair, produced by the array 84. The network 110 includes eight two-input AND circuits 112 corresponding, respectively, to the output signal conductors S1 to S8. We so apply the outputs of flip-flops FF1 to FF6 to the circuits 112 of network 110 as to provide the various outputs. Particularly, the output of flip-flop FF1 is applied to the circuits of the S1 to S3 conductors. The output of flip-flop FF2 is applied to the circuits 112 corresponding to conductors S4 to S6 and the output of FF3 is applied to the circuits corresponding to S7 and S8. Similarly, the output of FF4 is applied to the circuits 112 corresponding to S1, S4 and S7; the output of FF5 is applied to the circuits 112 corresponding to S2, S5 and S8, while the output of flip-flop FF6 is applied only to circuits 112 corresponding to S3 and S6. In this way we provide outputs S1 to S8 corresponding to respective pulse pair frequencies of F1F1, F1F2, F1F3, F2F1, F2F2, F2F3, F3F1, and F3F2.

It will be seen that there remains the pulse pair having frequencies F3F3. We utilize this pulse pair in a manner to be described to reset the entire system to prepare it to be set up by the next pulse pair to determine the particular operation to be performed.

Referring now to FIGS. 1 to 3, we use the signals S1 to S8 to control the operations of various function-determining networks, or "dictionaries," as D1, D2, D3 and D4. Prior to selecting the particular dictionary to be used, we ensure that all of the dictionaries are reset and are in a condition in which they can be activated by a pair of pulses. We use the pulse pair having frequencies F3F3 to reset the circuit. Stated otherwise, the first pair of pulses in a program command is always an F3F3 pair. Considering the action of this pulse pair, the first pulse passes through the filter 70 to conductor 82 to cause flip-flop FF3 to provide its output. Similarly, the second pulse activates flip-flop FF6 to cause that flip-flop to provide its output. It will be remembered that concomitant presence of these two particular signals does not produce an output from the network 110. A differentiating network 114 responds to the output on channel 108 to produce a pulse as indicated by the wave form E in FIG. 3 to provide one input to a three-input AND circuit 116. The other two inputs to this circuit are provided by flip-flops FF3 and FF6 so that the AND circuit 116 produces an output. The output of this AND circuit, which we have designated as wave form F in FIG. 3, is applied to a single-shot multivibrator 118 which provides a pulse indicated by wave form G to reset all of the dictionaries D1 to D4 in a manner to be described.

The output from the AND circuit 116 also passes through a two-input OR circuit 120 to the reset terminals of all of the flip-flops FF1 to FF6 to reset the flip-flops. In addition to performing these functions, the signal from circuit 116 is applied to the set terminal of a selection and command flip-flop 122 which we have designated as FF7.

It is to be noted also that both outputs of FF3 and FF6 are applied to a two-input AND circuit 124 which feeds a complement generator 126 to inhibit operation of a two-input AND circuit 128 upon the occurrence of a pulse pair having frequencies F3F3. The output on differentiator 114 provides a second input for the AND circuit 128 which is applied to a single-shot multivibrator 130.

From the foregoing it can be seen that following the occurrence of a pulse pair having frequencies F3F3, all of the dictionaries D1 to D4 and reset and all the flip-flops FF1 to FF6 likewise are reset. The next pulse pair of a series of pairs sets up the system to select one of the dictionaries D1 to D4 depending upon the desired function to be produced. By way of example, let us assume that the next pair of pulses have frequencies F1F1. Since this pair is not an F3F3 pair, AND circuit 124 provides no output so that the complement generator 126 provides one input for the circuit 128. The second pulse of this pair operates differentiator 114 to provide a second input to circuit 128 to actuate multivibrator 130. The wave forms H and I of FIG. 3 represent the outputs of AND circuit 128 and of multivibrator 130 respectively. We apply the output of this multivibrator to respective two-input AND circuits 132 and 134, each of which has the other input provided by either the set output of flip-flop 122 or the reset output thereof. Since under these conditions the flip-flop 122 has been set by the preceding F3F3 pair, multivibrator 130 causes circuit 132 to provide its output signal. A differentiating network 136 also responds to the output of multivibrator 130 to provide an input to OR circuit 120 to reset all of the flip-flops FF1 to FF6, and to reset FF7. Wave form J of FIG. 3 represents the output of network 136.

We apply the output of AND circuit 132 to the control input terminals of a plurality of gates G1 to G8. Each of the input terminals of these gates is connected to a respective one of the output conductors S1 to S8. It will be remembered that before resetting of the flip-flops FF1 to FF6, the pulse pair F1F1 produced an output on conductor S1. Since all of the gates G1 to G8 are energized by the output of circuit 132, gate G1 passes the output on conductor S1 to the control input terminal of dictionary D1.

Specifically dictionary D1 includes a relay winding 6R which is momentarily energized in response to the signal from G1. When energized winding 6R closes a switch 6R1 to complete its holding circuit through a normally closed switch 10R1 to a battery B5. Winding 10R is energized by a pulse from multivibrator 118 when the dictionary is to be reset. Energization of winding 6R also closes switches 6R2 to 6R9 to connect eight input conductors to eight output conductors. We may provide the dictionary with an extra, normally-closed switch 6R10 for a reason which will be apparent from the description hereinafter.

With the dictionary D1 thus rendered active, nothing further occurs until the next pair of pulses appears on the channel 40. By way of example, assuming that this pair of pulses has frequencies F3F2, the array of flip-flops 84 causes an output to be provided on conductor S8. As before, the second pulse of the pair causes differentiator 114 to provide an output which is applied to AND circuit 128 which, since the pair is not an F3F3 pair, operates multivibrator 130. It is to be remembered that following the occurrence of the preceding pair, flip-flop 122 was reset after the dictionary selection so that there exists one input to AND circuit 134. Operation of multivibrator 130 provides a second input for circuit 134 to cause it to produce an output which is applied to the control input terminal of a plurality of gating circuits G9 through G16 connected to the respective switches 6R2 to 6R9. We connect the respective conductors S1 to S8 to the signal input terminals of gates G9 through G16. In response to the application of the output of AND circuit 134, the gates G9 to G16 couple any signals existing on conductors S1 to S8 to respective output conductors, each of which provides one input for every one of the dictionaries D1 to D4. Owing to the fact that the pulse pair existing at this time is F3F2, conductor S8 is active and gate G16 couples this signal to the S8 input conductor of all of the dictionaries. Since only the dictionary D1 is active, this signal will pass only through now closed switch 6R9 of dictionary D1.

From the operation thus far described, it will be clear that the initial pulse pair of a group representing a programming command is always an F3F3 pair to reset the circuitry. The second pulse pair selects the particular dictionary among the various dictionaries provided for producing various functions. The third pulse pair effectuates the particular command through the dictionary selected. It will readily be apparent, of course, that with one dictionary active pulse pairs following the third may be provided to perform others of the functions afforded by the dictionary in use. By way of example, the dictionary D1 may provide track selection and tape direction. Thus, we connect the respective outputs, except the S5 output, of this dictionary to the conductors 42, 46, 50, 54, 58, 62 and 64. In the particular example being considered wherein the sequence of pulse pairs of frequencies F3F3, F1F1 and F3F2 appear, the result is a signal on conductor 64 which causes track 18 to be selected and which drives the tape 10 in the reverse direction. Other various operations can be followed through in this manner.

We may associate the dictionary D2 with a projection system 136. The command to a system of this type is given by stating the address of a particular slide or film frame to be projected. In a system known in the art, the address is expressed as two octonary digits, each 0 to 7. The first address is 00 and the last is 77 affording 64 distinct addresses. In our system each address is made up of two pairs of pulses, one for each of the two digits. Pulse pair F1F1 specifies the digit 0, the pulse pair F1F2 specifies the digit 1, and so forth. Since a system of this type is well known in the art, it will not be described in detail.

The dictionary D3 of our arrangement is used to actuate a response expression system 138 which is used to set up subsequent program portions as determined by the selection made by the student or by his failure to make a selection within a predetermined time. The details of such an arrangement are shown in our copending application referred to hereinabove. One difference in actuation of the system 138 from that shown in our copending application is that we use the S5 signal from dictionary D1 to activate the response expression apparatus. To do this we connect the S5 output channel of dictionary D1 to a conductor 140 connected to a relay winding 5R having its normally closed contact 5R1 in the holding circuit of the tape drive system 28. When a signal appears on output channel S5 of dictionary D1, winding 5R is energized to open contact 5R1 to stop the tape. It will be remembered that when neither the forward nor the reverse drive system for the tape is active, switches 2R2 and 4R2 are both closed to connected battery B3 to conductor 30 which leads to the response expression system 138 to activate that system.

When that has been done the system is conditioned to permit a response to be made. In the particular embodiment shown in the drawings, we provide three response push buttons PBA, PBB and PBC, as well as a green light 142 and a white light 144 for each push button. As has been explained hereinabove, the system 138 is substantially the same as that shown in our copending application and for that reason will not be shown in detail. In that system shown in the copending application, various subsequent programs were provided in response to the inputs to the system. Our system is substantially the same with the exception that we provide two more possibilities, since we are able to use a fourth track on the tape 10 for information rather than restricting it to control signals as in our copending application. In the system we employ for the apparatus 138, signal S1 is arranged to cause track 12 to be driven forward; signal S2 causes track 14 to be run forward; and signal S3 causes track 16 to be run forward. Signal S4 assigns a prompter program, while signal S5 indicates "no assignment." Signals S6, S7 and S8 drive the tape 10 backward, selecting tracks 14, 16 and 18, respectively.

As is the case with the response expression system shown in our copending application, when the system 138 is set up to permit a response to be made, all of the green lights 142 are lit. When any one of the push buttons PBA, PBB or PBC is actuated, the corresponding white light 144 lights to indicate that the selection has been made. In the system illustrated in the drawings we may provide the projection dictionary D2 with an extra, normally-closed switch such as switch 6R10 of dictionary D1 and connect the switch in the circuit of the white lights 144 by means of a conductor 146 to extinguish the white lights as the projection dictionary is activated following a response.

Our response expression apparatus 138, like that disclosed in our copending application, includes a stepping switch (not shown) having as many contacts or positions as there are response means to assign. In the particular example we have shown, there are three response selections as well as the "prompting" response to be assigned. In order to step the switch, we apply the signal on channel 132 to an input conductor 148 of the dictionary D3. Conductor 148 may be connected to the stepping switch through the medium of one of the normally open relay switches of the apparatus 138. The assignment "signal only" which we have indicated above may be used to actuate a buzzer or a red light or other suitable signaling device to indicate to the student that his response is incorrect without resetting the tape drive.

Referring now to FIGS. 2 and 4, the fourth dictionary D4 of our system is connected to a counter system 150 which may include, for example, three counters C1, C2 and C3, each of which has an "add 1" input section 152, an "add 4" section 154, a reset section 156, a readout section 158, and a most significant digit readout section 160. We use the eight commands available through the dictionary D4 to perform various operations. First, three commands are required to select among the three counters C1, C2 and C3. Two more signals are required, respectively, to add 1 or to add 4 to the selected counter. Another signal is required to read out the selected counter and still another to clear or reset the selected counter. The last command is a conditional command to be effected through the counter selected.

As is the case with all of the operations to be performed by our control system, when the counter system is to be used the first pulse pair will be F3F3 to reset the system. The second pulse pair which selects dictionary D4 is an F2F1 pair which passes through gate G4 to activate the dictionary. Now, in operation of the counter system the next pair of pulses must be one of the counter selecting commands which we have chosen to be F2F2, F2F3 or F3F1 corresponding, respectively, to the signal channels S6, S7 and S8. We connect the gates G14, G15 and G16 in these channels to respective counter selecting relay windings 7R, 8R and 9R.

Each relay winding has associated therewith two normally closed switches which disable the holding circuits for the other selecting relays and a normally open switch which completes a holding circuit for the selected relay. For example, winding 7R has associated therewith normally closed switches 7R6 and 7R7 and a normally open switch 7R8. We connect the arms of switches 7R6 and 7R7 to each other and to the battery B5 by means of a conductor 162. If a signal S6 appears, winding 7R is momentarily energized to close switch 7R8 and to open switches 7R6 and 7R7. This completes a holding circuit from winding 7R through switch 7R8, normally closed switch 9R7 and normally closed switch 8R7 which is connected to conductor 162. The circuits for the other windings 8R and 9R which are completed in response to respective signals on conductors S7 and S8 may be followed through in a similar manner. These holding circuits are interrupted upon energization of winding 7R by the opening of switches 7R6 and 7R7.

In addition to the switches just mentioned, each relay winding 7R, 8R and 9R has five normally open switches associated therewith. These switches are connected between the various conductors S1 to S5 and the sections of a respective counter to produce the desired operations. By way of example, switch 7R5 is connected between conductor S1 and the "add 1" section 152 of counter C1. The other switches 7R1 to 7R4 of relay 7R are so connected as to provide the respective operations of reading out the most significant digit in response to a signal on a conductor S5, passing the contents of the counter to a recording medium 164, such as a paper tape recorder in response to a signal on conductor S4, resetting counter C1 in response to a signal on conductor S3 and adding 4 to the count of counter C1 in response to a signal on conductor S2. The operation of the other counters C2 and C3 is substantially the same.

We use the readout of the most significant digit section of a counter to operate a conditional command. That is, we so arrange our system that the next dictionary selection following a readout of the most significant digit section of the counter is effective only if that most significant digit is a binary "1" indicating that the count of the counter exceeds a numerical value of 7. To achieve this operation, we apply the outputs of the sections 160 to a complement generator 166 connected to a relay winding 11R. When energized, winding 11R opens a normally closed switch 11R1 and closes a normally open switch 11R2. It will be appreciated that when the most significant digit output is a binary 1, winding 11R is not energized so that switch 11R1 is closed. We connect this switch in the output of AND circuit 132 so as to permit its output to be applied to gates G1 to G8 as long as the output of the selected section 160 is a "1." If, on the other hand, the count of the counter is not greater than 7, the selected section 160 has no output so that complementor 166 produces an output to energize winding 11R to open switch 11R1 to prevent the output of AND circuit 132 from being applied to the gates G1 to G8. Closing of switch 11R2 completes a holding circuit from winding 11R through switch 11R2 and through a normally closed switch 12R1 to a battery B6. To reset the disabling relay 11R, we apply the reset signal from network 136 to a single-shot multivibrator 168 to energize winding 12R to open switch 12R1 to disable relay winding 11R.

While we have illustrated only four dictionaries D1 to D4 enabled by the outputs of G1 to G4, we have available the outputs of the remaining gates G5 to G8 which can be used to enable additional dictionaries. Further functions which might be provided would be, for example, additional track and direction selection for a tape with more than four tracks or one with more than one speed in a given direction, or for additional auxiliary projectors. We might also provide "progressive clearing" by virtue of which we could extinguish the response expression green lights 142 one by one until the student makes a proper response. We could also order the machine to take the next command from a slide through a photoelectric reading system. Thus, our control system expands the capabilities of presently known machines beyond those now foreseen.

We so arrange our system as to ensure against improper operation thereof. More particularly, we provide a parity check which will stop the machine and signal the operator that the machine is not functioning properly in the event that the multivibrator 104 falls out of step or the like. Particularly referring now to FIG. 5, we have shown a parity check which ensures that the machine will run only when we have at least one output from the group of flip-flops FF1 to FF3 and one output from the group of flip-flops FF4 to FF6, while preventing operation if more than one output is present in either of the two groups. We apply the signals on conductors 86, 90 and 94 to a three-input OR circuit 170 and we apply the signals on conductors 88, 92 and 96 to a three-input OR circuit 172. The outputs of the two OR circuits are connected to a two-input AND circuit 174 which thus produces an output as long as there is one input from each of the groups of flip-flops. We also apply the signals on conductors 86, 90 and 94 to the inputs of a group of three two-input AND circuits 176, 178 and 180 so that one of these AND circuits provides an output in the event that any two of the conductors 86, 90 and 94 provide outputs. A second group of three two-input AND circuits 182, 184 and 186 receive inputs from conductors 88, 92 and 96 so that one of the circuits 182, 184 and 186 provides an output in the event that more than one of the conductors 88, 92 and 96 provide outputs. A six-input OR circuit 188 couples the output of any one of the AND circuits 176, 178, 180, 182, 184 and 186 to an inhibiting input terminal 190 of a normally conductive gating circuit 192. From the structure just described, it will be apparent that gating circuit 192 provides an output when one and only one conductor associated with each of the groups of flip-flops FF1 to FF3 and FF4 to FF6 provides an output signal.

We connect gating circuit 192 to a complement generator 194 which will not provide an output in response to the conditions just described but which otherwise will provide an output. We apply the output of complement generator 194 to a two-input AND circuit 196 which receives its other input from differentiator 114. When the conditions outlined above are not met, complement generator 194 provides an output and upon the occurrence of an output from circuit 114, a relay winding 13R is energized to complete its holding circuit through a contact 13R3 to a battery B7 and to complete the circuit of a signaling device, such as a lamp 198, through a switch 13R2 and to interrupt the tape drive circuit through a normally closed switch 13R1. It will readily be understood that we may connect switch 13R1 in series with switch 5R1 in the tape drive circuit. The winding 13R may be reset in response to operation of the start push button 1PB for example by interrupting the circuit through switch 13R3 to B7.

Referring now to FIG. 6, we have indicated schematically the arrangement of a system for producing master tapes on our teaching machine control system. The arrangement includes a tape transport system 200 and a recording head housing 202 which may, for example, include four or more recording heads corresponding to the number of available tracks on the tape 204. This arrangement includes a plurality of switches H1 to H4 adapted to be operated selectively to connect a microphone 206 or the like to one of the recording heads and to connect the command signal control system to the head. A three-position switch 208 controls the tape drive for forward movement, stop or reverse movement. An oscillator system 209 makes available the command signal frequencies F1, F2 and F3 while timing circuits 210 time the space between control pulses of a pair and between pairs of control pulses.

The arrangement includes a first bank of push buttons 212 adapted selectively to be operated to apply the first two pairs of command pulses to select among the various dictionaries. A second bank 214 is adapted to be actuated to a record a pair of pulses corresponding to a particular command. By way of example, we have indicated the frequencies of the pairs corresponding to the various buttons of the banks by the two-digit legends in the blocks representing the buttons.

To record a given control command onto a track in use, first one of the buttons of the bank 212 is actuated. This operation applies the initial pulse pair F3F3 and subsequently the pulse pair corresponding to the particular dictionary selected. For example, if the button corresponding to F1F2 is pressed, two pairs of pulses, F3F3 and F1F2, are applied to the track. Particularly each of the buttons of the bank 212 closes three switches, the first of which energizes two two-pulse timing circuits operating in succession and the other two contacts of which provide appropriate dictionary selection signals to gates operated by the second of the two timing circuits. When the initial pair and the dictionary selection pair of pulses have been recorded, one of the bank 214 of buttons is pressed to close three switches, the first of which energizes a timing circuit and the other of which supplies the appropriate command signal for the desired operation. The two-pulse timing circuits are made up of a suitable arrangement of single-shot multivibrators, differentiators and gates. While we have indicated an arrangement including four tracks, we could readily employ eight tracks using only four for the first half of the program and then switching to the other four for the second half while interchanging "forward" and "backward" in every command during the second program half. In this way we provide an automatic rewinding of the tape.

In operation of our teaching machine control system the tape is initially started by operating push button 1PB to cause the tape to be driven forward along the first track or track 12. Let us assume that the track is thus being driven and a command is to be produced to change the head and direction of movement of the tape. By way of example, if we wish to select head 22 corresponding to track 14 and to cause the tape to be driven in the reverse direction, we must select dictionary D1 and we must provide a command signal on channel S6 corresponding to conductor 58. In order to achieve this operation, there appear on the tape in the track 12 presently in use a group of pairs of pulses of frequencies F3F3, F1F1, and F2F3. The first pair of pulses causes the flip-flops FF3 and FF6 to provide outputs which, together with the output of circuit 114, provide a set signal for flip-flop FF7 through AND circuit 116, which circuit also provides a resetting pulse for flip-flops FF1 to FF6 through OR circuit 120. Concomitantly, single-shot multivibrator 118 provides a resetting signal for all of the dictionaries.

It will be seen from the foregoing that following the occurrence of an F3F3 pair, all of the circuits, except flip-flop FF7, are reset and the system is ready for the next set of pulses to select a dictionary. On the occurrence of the next set of pulses F1F1, flip-flops FF1 and FF4 provide outputs. Since under these conditions complement generator 126 provides an output, this signal, together with the output of network 114, causes circuit 128 to actuate multivibrator 130 to provide a second input for AND circuit 132 to open all the gates G1 to G8. Since this pair of pulses provides a signal on conductor 86 and on conductor 88, the signal passes through gate G1 to energize winding 6R to render dictionary D1 active. Further in response to the output of multivibrator 130, circuit 136 provides a signal for resetting flip-flop FF7.

Upon the occurrence of the next pair of pulses, which in the particular example under consideration are F2F3, signals appear on conductors 90 and 96 to provide an input to gate G14. At the same time, as in the case of the second pair of pulses, multivibrator 130 provides its output signal which, together with the reset output of flip-flop FF7, activates circuit 134 to open all of the gates G9 through G16. The signal applied to gate G14 is coupled through dictionary D1 by means of switch 6R7 to conductor 58 to pass through OR circuit 48 to energize winding 2H to select head 22 and to pass through OR circuit 60 to cause the tape to be driven in the reverse direction.

Following the operations just described, dictionary D1 remans active until a different control operation is to be performed. Until that time, other pairs of pulses can cause track switching and change in track direction as desired. When a different operation is to be performed, a new group of pairs of pulses beginning with an F3F3 pair appears on the tape.

The response expression apparatus 138 is activated by selecting a dictionary D3 in a similar manner. Before this is done, however, dictionary D1 must have been active to permit the application of a signal to line 140 to stop the tape drive and to couple battery B3 to the apparatus 138. In this system, too, we use the output from AND circuit 134 to step the stepping switch of the apparatus 138. Its particular operation will be apparent from the description hereinabove and from the disclosure of our copending application. Similarly, the projection system is selected by activating dictionary D2 and providing a two-digit number to select a particular slide, for example, in the manner described above.

When the counter system is active by virtue of selection of the dictionary D4, the first pair of pulses following the dictionary selection are used to select among the three counters C1 to C3. When that has been done, the counter may be reset, either 1 or 4 may be added thereto, or the counter may be read out. If desired, a conditional command may be given to prevent a subsequent operation from taking place by determining that the total registered by the counter is not greater than 7 in the manner described above.

It will be seen that we have accomplished the objects of our invention. We have provided a teaching machine control system which makes optimum use of the space available on the record medium. Our system does not require the use of a separate control track. It incorporates means for preventing undesired or unintended operation of the machine. With our system we are able to use different control commands for different tracks at the same location on the record medium. Our system is more versatile than are systems of the prior art.

It will be understood that certain features and subcombinations are of utility and may be employed without reference to other features and subcombinations. This is contemplated by and is within the scope of our claims.

It is further obvious that various changes may be made in details within the scope of our claims without departing from the spirit of our invention. It is, therefore, to be understood that our invention is not to be limited to the specific details shown and described.

Having thus described our invention, what we claim is:

1. A control system for a teaching machine using a record medium carrying a group of pairs of command pulses, said machine having means for selectivity performing a number of different operations, means responsive to one pair of said pulses for enabling said operation performing means, means responsive to another pair of pulses for selectively actuating said enabled means to perform one of said operations and means responsive to a different other pair of said pulses for selectively actuating said enabled means to perform a different one of said operations.

2. A control system as in claim 1 including means responsive to the first pulse pair of a group for resetting said operation performing means.

3. A control system for a teaching machine employing a record medium having a track of recorded information carrying a group of pairs of command pulses, said machine including a plurality of means for accomplishing respective functions, each of said function accomplishing means adapted to perform a number of operations involving the same function, including in combination, means responsive to one pair of said pulses for selectively enabling one of said function accomplishing means, means responsive to a different pair of said pulses for selectively enabling a different function accomplishing means, and means responsive to another pair of said pulses for selectively actuating the enabled function accomplishing means to perform one of said operations 4. A control system as in claim 3 in which one of said function accomplishing means is a track switching apparatus and another of said function accomplishing means is a projection apparatus.

5. A control system as in claim 4 in which a third one of said function accomplishing means is a response expression apparatus.

6. A control system as in claim 4 in which a third one of said function accomplishing means is a counting system.

7. A control system as in claim 3 including means responsive to the initial pair of pulses of a group for resetting said function accomplishing means.

8. A control system as in claim 3 in which the pulses of said pairs have frequencies in a number of different relationships of a plurality of different frequencies, said means responsive to said pairs of pulses each comprising means for producing respective signal correponding to said relationships.

9. A control system as in claim 3 in which said means responsive to said one pulse pair comprises a plurality of gating circuits corresponding in number to the number of said function accomplishing means and means responsive to said one pair of pulses for selectively rendering one of said gates active.

10. A control system as in claim 3 in which said group of pairs of command pulses comprises at least three pairs, and in which one of said function accomplishing means comprises a plurality of counters and means for selecting one of said counters, said one pulse pair enabling said selecting means, said other pulse pair actuating said selecting means to activate one of said counters and a third pulse pair actuating the activated counter.

11. A control system as in claim 3 in which said group of pairs of command pulses comprises at least three pairs, and in which one of said function accomplishing means comprises a plurality of counters and means for selecting one of said counters, said one pulse pair enabling said selecting means, said other pulse pair actuating said selecting means to activate one of said counters and a third pulse pair actuating the activated counter, each of said counters comprising a most significant place readout section, said third pulse pair adapted to actuate said most significant place readout and means responsive to the count of said most significant place for disabling said one pulse pair responsive means.

12. A control system for a teaching machine employing a record medium having a track of recorded information carrying a group of pairs of command pulses, said pulse pairs having frequencies in a number of different relationships, said frequencies all lying above the audible range, a plurality of means for accomplishing respective functions, each of said function accomplishing means adapted to perform a number of operations invloving the same function, the frequencies of the pulses of the first pair always having a particular frequency relationship, means responsive to said first pulse pair for resetting said function accomplishing means, means responsive to pulse pairs having frequency relationships other than said particular relationship for providing a plurality of control signals, means responsive to the control signal corresponding to the second pulse pair of a group for selectively enabling one of said function accomplishing means and means responsive to a control signal corresponding to a pulse pair following the second pair for actuating the selected function accomplishing means.

13. A control system as in claim 12 in which said control signal producing means comprises first and second groups of flip-flop circuits, means responsive to the first pulse of each pair for selectively setting a flip-flop of the first group to provide an output signal, means responsive to the second pulse of each pair for selectively setting a flip-flop of the second group to provide an output signal and means for combining said output signals to produce said control signals.

14. A control system as in claim 12 in which said control signal producing means comprises first and second groups of flip-flop circuits, means responsive to the first pulse of each pair for selectively setting a flip-flop of the first group to provide an output signal, means responsive to the second pulse of each pair for selectively setting a flip-flop of the second group to provide an output signal and means for combining said output signals to produce said control signals, a tape drive system and means for disabling said tape drive system unless only one flip-flop circuit of each group provides an output signal.

15. A control system as in claim 12 in which said control signal producing means comprises first and second groups of flip-flop circuits, means responsive to the first pulse of each pair for selectively setting a flip-flop of the first group to provide an output signal, means responsive to the second pulse of each pair for selectively setting a flip-flop of the second group to provide an output signal and means for combining said output signals to produce said control signals, each of said first and second pulse responsive means comprising two groups of two input AND circuits associated with said flip-flop circuits, respective filters corresponding to said pulse frequencies, means coupling the filter outputs respectively to one input terminal of an AND circuit of each group, means providing a second input for the AND circuits of the first group at the time of occurrence of the first pulse of a pair and means providing a second input for the AND circuits of the second group at the time of occurrence of the second pulse of a pair.

16. A control system as in claim 13 including means responsive to the second pulse of a pair for resetting said flip-flops.

17. In a control system for a teaching machine, a record medium, a plurality of tracks of recorded information of audible frequencies, a plurality of groups of pairs of command pulses of command information superimposed on said tracks at locations along the length of said record medium, each of said groups representing a separate command, said pulses being of various frequencies lying above the audible range, the pulses of said pairs having various frequency relationships.

18. In a control system as in claim 17 in which one of said groups of pairs of command pulses occupies a particular location along the length of said record medium, said one group of pulses representing a particular command, and a second group of pairs of command pulses superimposed on another track, said second group occupying generally the same location along the length of said record medium as the first group, said second group of pulses representing a different command.

References Cited

UNITED STATES PATENTS

| | | | |
|---|---|---|---|
| 3,126,646 | 3/1964 | Penraat et al. | 35—9 |
| 3,255,536 | 6/1966 | Livingston | 35—9 |

WILLIAM A. GRIEB, Primary Examiner